US012789949B2

(12) United States Patent
Moore et al.

(10) Patent No.: US 12,789,949 B2
(45) Date of Patent: Nov. 10, 2026

(54) BREAK-AWAY RELEASE LINK

(71) Applicant: Coastline Cordage Group Ltd., Bedford (CA)

(72) Inventors: David Eric Moore, Halifax (CA); Matthew David Moore, Upper Tantallon (CA)

(73) Assignee: Coastline Cordage Group Ltd., Bedford (CA)

( * ) Notice: Subject to any disclaimer, the term of this patent is extended or adjusted under 35 U.S.C. 154(b) by 219 days.

(21) Appl. No.: 18/845,087

(22) PCT Filed: Mar. 8, 2022

(86) PCT No.: PCT/CA2022/050329

§ 371 (c)(1),
(2) Date: Sep. 9, 2024

(87) PCT Pub. No.: WO2023/168509

PCT Pub. Date: Sep. 14, 2023

(65) Prior Publication Data

US 2025/0178696 A1 Jun. 5, 2025

(51) Int. Cl.
*B63B 21/20* (2006.01)
*A01K 69/06* (2006.01)
*B63B 21/00* (2006.01)

(52) U.S. Cl.
CPC .............. *B63B 21/20* (2013.01); *A01K 69/06* (2013.01); *B63B 2021/004* (2013.01); *B63B 2021/203* (2013.01)

(58) Field of Classification Search
CPC .............. B63B 21/20; B63B 2021/004; B63B 2021/203; A01K 69/06; A01K 75/00; A01K 69/08
See application file for complete search history.

(56) References Cited

U.S. PATENT DOCUMENTS 5,529,293 A * 6/1996 Haugs .................... B63B 21/20 92/92
5,987,710 A * 11/1999 Paul ...................... F16G 11/103 24/130
(Continued)

FOREIGN PATENT DOCUMENTS

EP 1659209 B1 5/2006
EP 2186551 B1 5/2010
(Continued)

OTHER PUBLICATIONS

Werner, Timothy, et al. "Fishing techniques to reduce the bycatch of threatened marine animals." Marine Technology Society Journal 40.3 (2006): 50-68. (Year: 2006).*
(Continued)

*Primary Examiner* — Amber A Misiaszek
(74) *Attorney, Agent, or Firm* — Rahman LLC

(57) ABSTRACT

A break-away release link that is used as an attachment to at sea fixed gear commercial fishing. The break-away release link is designed to break away at a designated tensile strength when undersea creatures become entangled with this type of commercial fixed fishing gear. The break-away release link attachment can be used in any commercial fishing industry such as lobster, crab, finfish, or other types whereas fixed gear, such as lobster traps or gillnets that are placed upon the ocean floor and are attached by a buoy rope to a surface buoy for retrieval at some later time by the fisherperson. The break-away release link is designed to break away at a tensile strength of between 600 and 3,000 pounds so that sea going creatures who becomes entangled with the buoy rope can easily part the rope and escape serious injury and or death when they are endangered.

19 Claims, 3 Drawing Sheets

(56) References Cited

U.S. PATENT DOCUMENTS

| | | | | |
|---|---|---|---|---|
| 6,564,500 | B1 * | 5/2003 | Ames .................. | A01K 91/047 43/43.12 |
| 9,145,639 | B2 | 9/2015 | Vandrovcova et al. | |
| 2004/0200126 | A1 * | 10/2004 | Ames ..................... | A01K 69/00 43/43.12 |
| 2005/0155271 | A1 | 7/2005 | Holy | |
| 2022/0063768 | A1 | 3/2022 | Fields | |

FOREIGN PATENT DOCUMENTS

| | | | |
|---|---|---|---|
| WO | 2009059445 | A1 | 5/2009 |
| WO | 2016089215 | A1 | 6/2016 |

OTHER PUBLICATIONS

Moore, D. et al., PCT/CA2022/050329, International Search Report, May 4, 2022, 4 pages.
Moore, D. et al., PCT/CA2022/050329, Written Opinion, May 4, 2022, 5 pages.

* cited by examiner

BREAK-AWAY RELEASE LINK

FIELD OF THE INVENTION

The present invention relates to a break-away release link attachment that will be inserted between a floating surface buoy and a bottom set fishing apparatus that will break apart when contacted by sea dwelling creatures.

BACKGROUND OF THE INVENTION

The commercial fishing industry uses a variety of fishing gear that is set upon the bottom of the ocean and passively catches whatever species offish or crustaceans that are targeted.

In every case the fixed gear is attached to a floating device—a buoy of some sort. In between the fixed gear on the ocean floor and the buoy there is always a rope of some sort. It is that section of rope that is a serious threat to sea going mammals, such as whales. Two types of fixed gear arc "trap" fishing, such as used in lobster and crab commercial fishing, and "gillnet" fishing, which uses vertical panels of netting.

Sea dwelling creatures, such as whales, often encounter buoy lines in the oceans throughout the world and become seriously injured and in many circumstances succumb to these injuries. Many of these species, such as Right Whales, are on an endangered species list, with an estimated 2020 population of fewer than 400; and of those 400 there are fewer than 100 breeding females remaining. Many die every year due to entanglement with buoy lines used in the commercial fishing industry.

A "buoy line" refers to the length of rope that extends from the ocean surface floating buoy to the ocean bottom set fishing apparatus. This buoy line is used between any type of fixed gear commercial fishing method.

Buoy lines used in today's modern commercial fishing fleet are in many cases 250% stronger than buoy lines used only a few decades ago.

Over the past 50 years ropes have evolved from natural fibers to synthetic. Most of the ropes used in the commercial fishing industry are made from Polypropylene, Polyethylene and a blending of High-Density Polyethylene and Polypropylene. The ropes used in today's modern fishery are in the range of 250% stronger than ropes used in the 1950's and earlier.

Whereas before, sea going creatures may indeed have the capacity to break buoy lines, today's ropes are too strong for the creature to break. If there is no passive method to escape, buoy lines often wrap around many parts of the body. These engagements around the head, flippers, tail or in the baleen cut deeply into the animal, causing serious injury or indeed death.

Unless there is some sort of release mechanism employed in the buoy line, escape by marine creatures who become entangled by these buoy lines happens more by luck than method.

To date, there have been a few attempts at a solution to this problem. "Rope on Demand", where a fishing vessel sends an electronic signal to an apparatus attached to gear on the ocean bottom.

This signal is supposed to release and float the trap rope to the surface. However, this product has found to have many operational difficulties. Also, this product is extremely expensive and not cost effective to the average commercial fisherperson.

Other products that have been developed are either installed at the bottom of the buoy line attached to the fixed gear such as a lobster trap, or at the top attached to the floating buoy. This does not solve the problem of creatures swimming within the water table.

What is needed is a passive method to allow the entangled creature to have the ability to free themselves from the fixed buoy line. Thereby minimizing or eliminating injury altogether.

What is needed is a solution that will break when sea creatures such as whales, dolphins, porpoises, and other cetaceans collide with fixed commercial fishing gear buoy lines.

What is needed is a solution that will be commercially viable in cost, long life expectancy and will not disrupt or dramatically effect present commercial fishing methods.

SUMMARY OF THE INVENTION

The present invention is a commercially viable weak link to be positioned at pre-determined distances within the buoy line between the buoy and the fishing apparatus. This weak link section will break apart or release if a sea going creature becomes engaged with the buoy line. Allowing the creature to escape, rather than entangling with the buoy line and consequently cutting into the flesh of the creature.

The present invention includes a section of a break-away release link that is placed between the surface buoy and the fishing gear that has been placed on the ocean floor to capture whatever species the fisherperson is attempting to catch. These types of gear are often left unattended for lengthy periods of time and pose a serious threat to undersea creatures. The break-away release link is designed to function as a "safety valve" when the fisherperson is not around attending to their fishing gear.

The present invention relates to rope that is used as a buoy line used in fixed gear commercial fishing that presents an imminent danger between the buoy line and sea going creatures. The buoy line runs from the sea surface floating buoy to sea bottom fishing gear that sits on the ocean floor to catch a variety of species. Some include crustaceans such as lobster and crab that are captured in traps. Groundfish such as cod that are caught in fixed gillnets. Also, species such as haddock that are captured using fixed longline gear. Whenever a rope is extended from the sea surface to the ocean bottom, the invention is designed to easily break away upon entanglement.

One object of the invention is to provide a weak spot within the buoy line that will break more easily than the stronger complete length of buoy line. With this objective, a length of rope that is twisted, braided, or otherwise made that has loops or eyes that have been spliced at one, or both ends. These splices are designed to break within the limits determined by the scientific community so the sea creature can easily break and escape entanglement with the buoy line. The eye splices are designed to have a tensile strength of between 600 and 3000 pounds. To date that optimal maximum break strength of 1700 pounds is the targeted optimal break strength. Once an ocean-going creature becomes entangled within the buoy lines and the struggle to escape begins our product is designed to break at 1,700 pounds or less. At 1700 pounds or less tensile strength, the sea going creature will have the capacity to break the buoy lines and escape with minimal or no harm to the creature.

However, this invention can be adjusted as the scientific community adjusts that tensile strength number to suit various fisheries, locations, working environments or methods.

To achieve the desired break strength, in one aspect of the present invention loops or eye splices are sewn together using any type of stitching method or material at one, or both ends of the break-away release link. It is not the buoy line rope itself that will break, but rather the sewn eye splice at one or both ends of the break-away release link. Having the sewn eye splice at both ends would double the chances of escape, and is preferred; however, the invention would still operate with only a single sewn eye splice. The break-away release link itself can be of any length or size, depending upon the targeted fishery. Within the break-away release link the size of the eye splice can also be of any size depending upon the targeted commercial fishery. The break-away release link, splicing materials and any other components can be synthetic in nature and made from any synthetic fiber such as polyester, nylon, polypropylene, polyethylene. Or any natural fiber such as cotton, sisal, jute. Or a combination of any two or more of these fibers.

The break-away release link can be formed using rope that is similar to the buoy line, so the rapid hauling of gear such as lobster traps will not be affected or slowed down. The break-away release link must flow easily and unabated through trap, net, or longline haulers on the deck of the fishing boat. It also must be easily handled and stored on deck.

The break-away release link can be installed at one location, or multiple locations in the length of the buoy line.

In use, the commercial fisher will install the break-away release link at some point within the buoy line. The location on the buoy line will be governed by regulatory authorities such as The Department of Fisheries and Oceans. Installation itself will involve cutting the present buoy line and attaching the break-away release link. The most common method of attachment would most likely be using a tuck splice, thus joining the first section of buoy line and the second section of buoy line with the break-away release link, but any type of splice or even as simple as tying a knot would suffice.

Once the buoy line has the break-away release link installed, the buoy line is ready to be put in service.

The break-away release link can also incorporate features such as special markings indication species targeted by the fisher person, area that the fishing was ongoing and country or region.

The product can be any color, diameter or length as determined by local commercial fishing regulations or government regulation departments. This is either completed using pre-determined color patterns or imbedded radio frequency identification (RFID) tags. All relevant data achieved is valuable to the scientific community when evaluating endangered species activities and habits.

All components will be protected with heat shrink tubing.

BRIEF DESCRIPTION OF THE DRAWINGS

The invention will be further understood from the following description with reference to the attached drawings.

DETAILED DESCRIPTION OF THE PREFERRED EMBODIMENT

Figure 1:
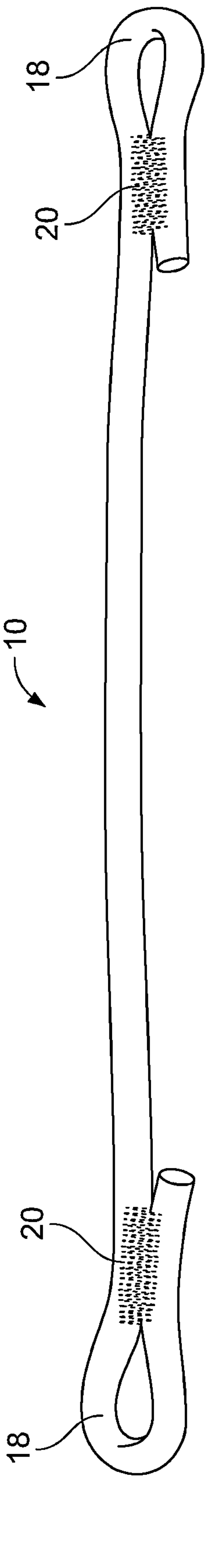
FIG. 1 is a drawing of a break-away release link according to the present invention.

A preferred embodiment of the present invention will be set forth in detail with reference to the drawings, in which like reference numerals refer to like elements or method steps throughout.

The exemplary embodiments of the present disclosure are described and illustrated below for example purposes only. It will be apparent to those of ordinary skill in the art that the embodiments discussed below are exemplary in nature and may be reconfigured without departing from the scope and spirit of the present disclosure. However, for clarity and precision, the exemplary embodiments as discussed below may include optional steps, methods, and features that one of ordinary skill should recognize as not being a requisite to fall within the scope of the present disclosure.

FIG. 1 shows an embodiment of the break-away release link 10, between a first section of a buoy line 12 and a second section of a buoy line 14. The first and second section of buoy line 12, 14 is a typical buoy line well known in the art. In this Figure, each section of buoy line is a 3-strand trap buoy line having eye-splices 16 at the end connecting to the break-away release link 10.

The break-away release link 10 itself includes an eye splice 18 at least at one end. The eye splice 18 can be completed using any method known in the art. In the preferred embodiment shown in FIG. 1, there is an eye splice 18 at each end. Having the sewn eye splice 18 at both ends would double the chances of escape of a trapped sea creature.

Each eye splice 18 of the break-away release link 10 includes stitching 20 which has a tensile strength of between 600 and 3000 pounds. The preferred maximum break strength of 1700 pounds is the targeted optimal tensile strength. However, the preferred tensile strength can be adjusted as determined necessary by the scientific community to suit various fisheries, locations, working environments or methods.

The break-away release link 10, splicing materials and any other components can be synthetic in nature and made from any synthetic fiber such as polyester, nylon, polypropylene. polyethylene.

Or any natural fiber such as cotton, sisal, jute. Or a combination of any two or more of these fibers. Wherever possible, recyclable materials would be used, but this is not essential to the invention.

The break-away release link 10 can be made with any color, firmness, diameter or length. Ideally, the break-away release link 10 is made using rope that is similar to the buoy line 12, 14. In the preferred embodiment, the break-away release link 10 is approximately 3 feet long, with the at least one eye splice 18 being approximately 4 inches long. The diameter of the break-away release link 10 would be approximately ½" for an offshore fleet, and ⅜' for an inshore fleet.

The break-away release link 10 is made in two stages. The first is where rope is made using any braided or twisted method. Then a stitched eye splice 18 is sewn at one or both ends of the length of rope used.

The commercial fisherperson can easily splice the break-away release link 10 at pre-determined intervals into the buoy lines 12, 14. The most common method of attachment would most likely be using a tuck splice, thus joining the first section of buoy line 12 and the second section of buoy line 14 with the break-away release link 10, but any type of splice known in the art, or even as simple as tying a knot, would suffice. Once the buoy line sections 12, 14 have the break-away release link 10 installed, the system is ready to be put in service.

The break-away release link 10 may have one or more imbedded radio frequency identification (RFID) tag (not shown), in order to passively provide intellectual information to the scientific community.

The break-away release link 10, and in particular the eye splice 18 and stitching 20, may have heat shrink tubing (not shown) encircling its components for protection.

Figure 2:
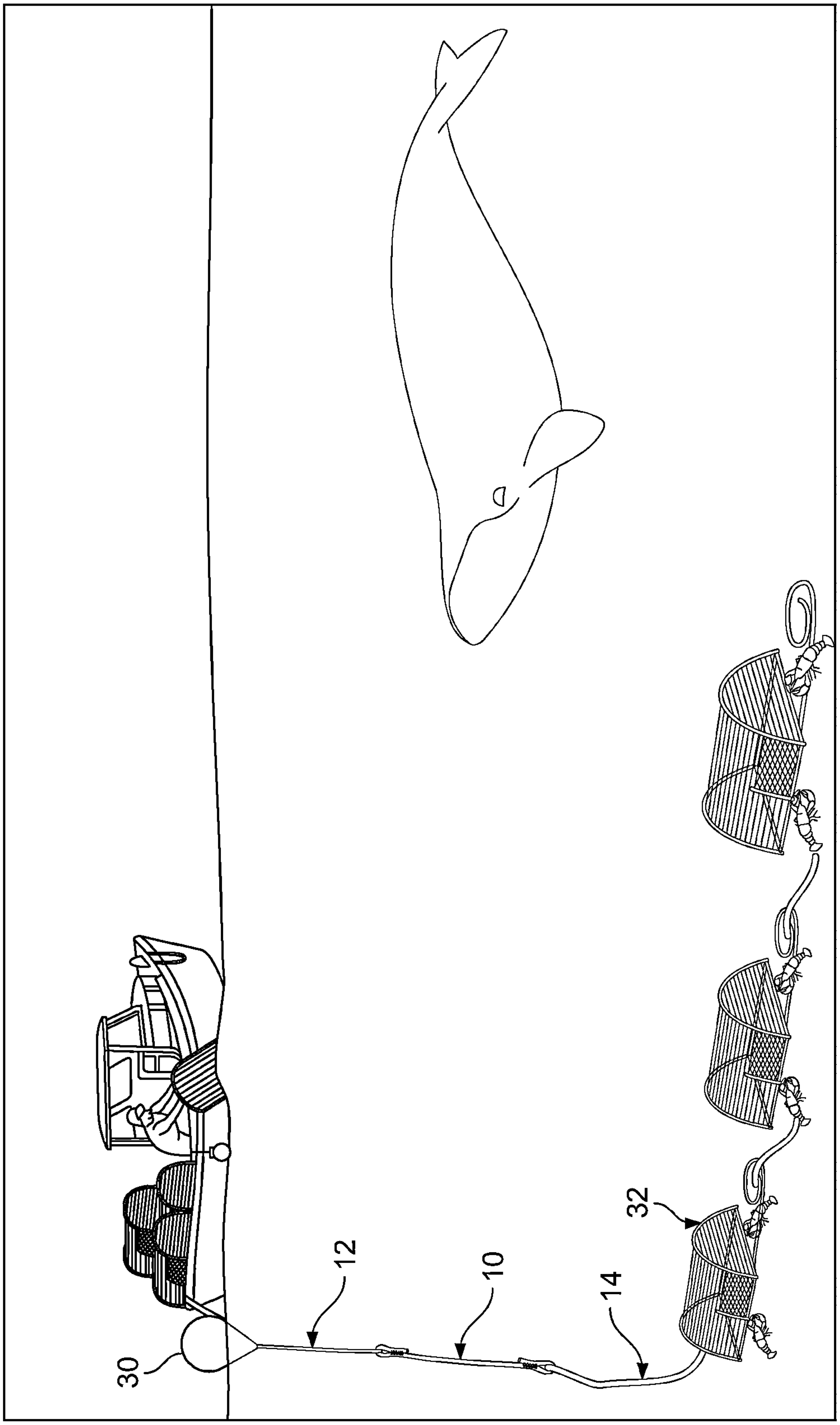
FIG. 2 shows the break-away release link usage in a fixed gear trap fishing (lobster) situation.

FIG. 2 shows the break-away release link 10 in use between the first section of the buoy line 12 which leads up to a buoy 30, and the second section of buoy line 14 leading to a fixed gear trap 32.

Figure 3:
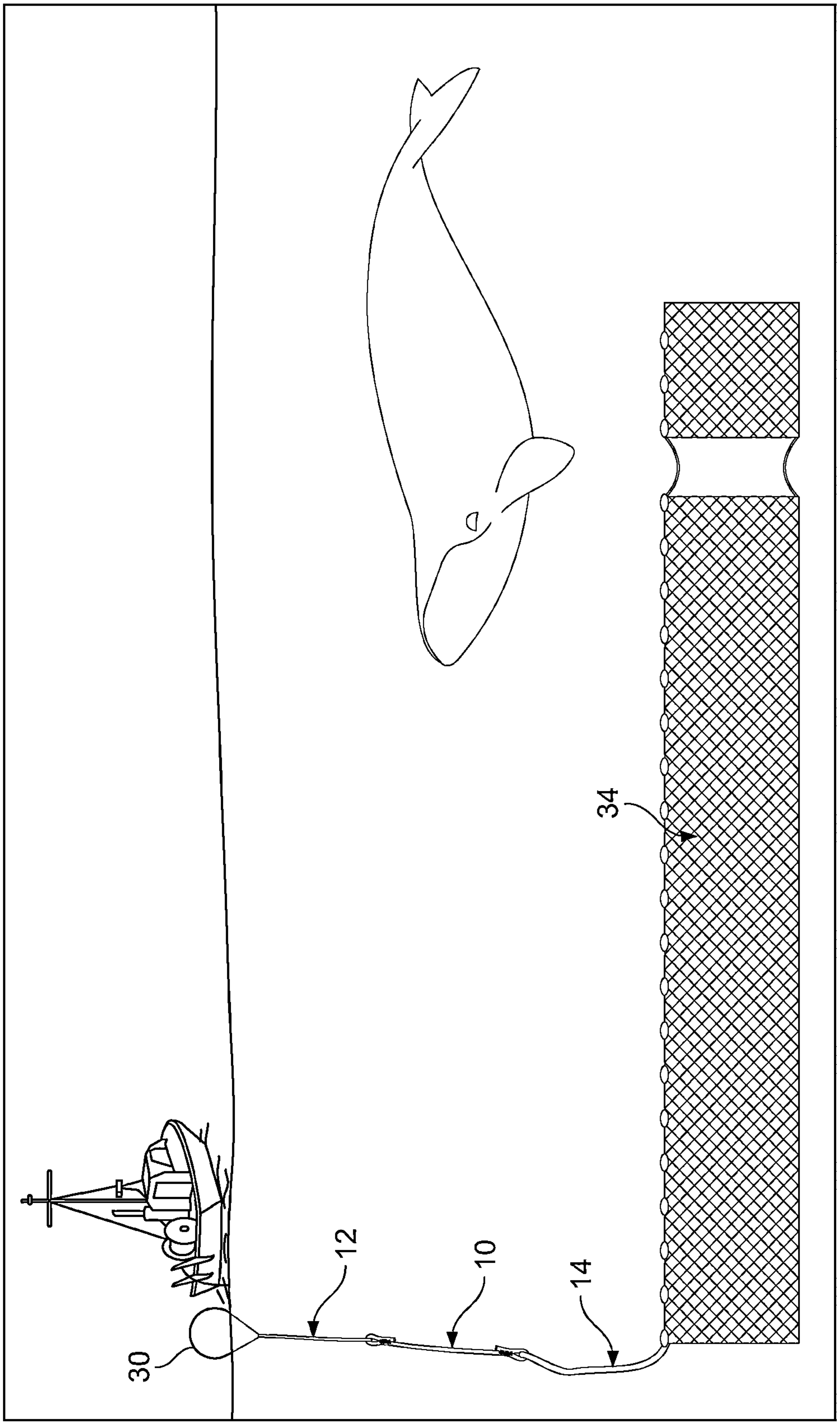
FIG. 3 shows the break-away release link usage in a fixed gear gillnet fishing situation.

FIG. 3 shows the break-away release link 10 in use between the first section of the buoy line 12 which leads up to a buoy 30, and the second section of buoy line 14 leading to a fixed gillnet 34.

Following from the above description, it should be apparent to those of ordinary skill in the art that, while the methods and apparatuses herein described constitute exemplary embodiments of the present invention, the invention described herein is not limited to any precise embodiment and that changes may be made to such embodiments without departing from the scope of the invention as defined by the claims. For example, it would be understood by a person skilled in the art that the second section of buoy line 14 could lead to the buoy 30, and the first section of buoy line 12 could lead to the fixed gear trap 32 or fixed gillnet 34.

The scope of the claims should not be limited by the preferred embodiments set forth in the examples but should be given the broadest interpretation consistent with the description as a whole. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

REFERENCE NUMERALS

10—break-away release link
12—first section of buoy line
14—second section of buoy line
16—buoy line eye splice
18—release link eye splice
20—stitching
30—buoy
32—fixed gear trap
34—fixed gillnet

What is claimed is:

1. A break-away link to releasably connect a first section of buoy line to a second section of buoy line, the break-away link comprising:
- a first end which is sewn into an eye splice, where the first end attaches to the first section of buoy line;
- a second end which attaches to the second section of buoy line;
- wherein the eye splice of the first end includes stitching having a tensile strength between 600 and 3000 pounds.

2. The break-away link of claim 1, wherein the second end attached to the second section of buoy line includes a second eye splice having stitching with a tensile strength between 600 and 3000 pounds.

3. The break-away link of claim 1, wherein the stitching of the eye splice of the first end has a tensile strength of 1700 pounds.

4. The break-away link of claim 2, wherein the stitching of the second eye splice has a tensile strength of 1700 pounds.

5. The break-away link of claim 1, wherein the break-away link is made of the same type of rope as the buoy line.

6. The break-away link of claim 1, wherein the eye splice of the first end is encircled by heat shrink tubing.

7. The break-away link of claim 2, wherein the second eye splice is encircled by heat shrink tubing.

8. The break-away link of claim 1, further comprising at least one imbedded radio frequency identification (RFID) tag.

9. The break-away link of claim 2, wherein the break-away link is made of the same type of rope as the buoy line.

10. The break-away link of claim 3, wherein the break-away link is made of the same type of rope as the buoy line.

11. The break-away link of claim 4, wherein the break-away link is made of the same type of rope as the buoy line.

12. The break-away link of claim 3, wherein the eye splice of the first end is encircled by heat shrink tubing.

13. The break-away link of claim 4, wherein the second eye splice is encircled by heat shrink tubing.

14. The break-away link of claim 2, further comprising at least one imbedded radio frequency identification (RFID) tag.

15. The break-away link of claim 3, further comprising at least one imbedded radio frequency identification (RFID) tag.

16. The break-away link of claim 4, further comprising at least one imbedded radio frequency identification (RFID) tag.

17. The break-away link of claim 5, further comprising at least one imbedded radio frequency identification (RFID) tag.

18. The break-away link of claim 6, further comprising at least one imbedded radio frequency identification (RFID) tag.

19. The break-away link of claim 7, further comprising at least one imbedded radio frequency identification (RFID) tag.

* * * * *